United States Patent
Bates et al.

(10) Patent No.: US 7,123,998 B2
(45) Date of Patent: Oct. 17, 2006

(54) AUTOMATED TRANSMISSION SYSTEMS

(75) Inventors: Ian Richard Joseph Bates, Huddersfield (GB); Burkhard Pollak, Bühl (DE); In Ho Song, Warwickshire (GB); Youngkeun Park, Warwickshire (GB); Christian Rieger, Bischweier (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 197 days.

(21) Appl. No.: 10/758,804

(22) Filed: Jan. 16, 2004

(65) Prior Publication Data

US 2004/0209733 A1 Oct. 21, 2004

(30) Foreign Application Priority Data

Jan. 18, 2003 (GB) .................. 0301171.5

(51) Int. Cl.
*G01P 13/04* (2006.01)
*G01P 3/54* (2006.01)
*G06F 17/00* (2006.01)

(52) U.S. Cl. ............... 701/1; 701/34; 701/93; 324/161; 324/165; 340/672

(58) Field of Classification Search .............. 701/1, 701/70, 74, 79, 93, 29, 34, 35; 324/161.165, 324/166, 173, 207.2, 207.25; 340/441, 670, 340/672

See application file for complete search history.

(56) References Cited

U.S. PATENT DOCUMENTS

| 4,771,657 | A | | 9/1988 | Iwatsuki | 74/866 |
|---|---|---|---|---|---|
| 5,079,708 | A | * | 1/1992 | Brown | 701/72 |
| 5,105,923 | A | | 4/1992 | Iizuka | 192/4 A |
| 5,510,707 | A | * | 4/1996 | Caron | 324/166 |
| 6,078,851 | A | * | 6/2000 | Sugitani | 701/34 |
| 6,498,474 | B1 | * | 12/2002 | Turner | 324/165 |
| 6,747,553 | B1 | * | 6/2004 | Yamada et al. | 340/441 |

FOREIGN PATENT DOCUMENTS

| EP | 0043660 | 4/1986 |
|---|---|---|
| EP | 0038113 | 7/1986 |
| EP | 0059035 | 1/1987 |
| EP | 0101220 | 1/1987 |
| EP | 0781946 A1 | 7/1997 |
| EP | 0784001 A2 | 7/1997 |
| WO | WO 92/13208 | 8/1992 |
| WO | WO 02/066870 | 8/2002 |
| WO | WO02/085661 A1 | 10/2002 |

* cited by examiner

*Primary Examiner*—Tan Q. Nguyen
(74) *Attorney, Agent, or Firm*—Simpson & Simpson, PLLC

(57) ABSTRACT

An automated transmission system includes a transmission brake which is used to apply a braking torque to the transmission, while the engine torque is negative and a transmission clutch is disengaged to effect a gear downshift, in order to avoid acceleration of the vehicle when the clutch is released and abrupt deceleration of the vehicle upon completion of the gear downshift.

3 Claims, 6 Drawing Sheets

US 7,123,998 B2

AUTOMATED TRANSMISSION SYSTEMS

CROSS-REFERENCE TO RELATED APPLICATION

This patent claims priority of United Kingdom Patent Application No. 0301171.5, filed Jan. 18, 2003, which application is incorporated herein by reference.

BACKGROUND OF THE INVENTION

The present invention relates to automated transmission systems and in particular to automated transmission systems in which an automatically operated transmission clutch is provided between a vehicle engine and a multi-ratio gear box.

The invention particularly relates to the control of such systems when gear downshifting on an incline, in order to provide engine braking of the vehicle. In such circumstances when the clutch is automatically released in order to permit engagement of a lower gear, engine braking which was applied in the higher gear will be lost, thus allowing the vehicle to speed up. In similar circumstances with a manual transmission, this would be expected and the driver can take appropriate action to mitigate the effect. However, with an automated transmission system, when the system downshifts automatically, without input from the driver, the acceleration of the vehicle will be unexpected and would be disconcerting to the driver.

BRIEF SUMMARY OF THE INVENTION

According to one aspect of the present invention an automated transmission system for a vehicle comprises a multi-ratio gear box connected to an engine by means of a transmission clutch, a transmission brake acting on a component of the transmission between the transmission clutch an the driven wheels of the vehicle, an electronic control unit, means for sensing actuation of the transmission brake and sending a signal indicative thereof to the control unit, means for sensing the engine torque and sending a signal indicative thereof to the control unit, means for sensing the vehicle speed and sending a signal indicative thereof to the control unit, means for sensing whether a gear downshift is requested or in operation and sending a signal indicative thereof to the control unit, and means for sensing whether an operating brake of the vehicle is applied and sending a signal indicative thereof to the control unit; characterized in that the control unit controls operation of the transmission brake to apply a braking torque to the transmission, if the engine torque is negative, the vehicle speed is above a predetermined value, a gear downshift has been requested or is in progress and the operational brakes of the vehicle are not applied.

In this manner as the clutch is released for the gear downshift, the engine braking torque lost may be replaced by application of a braking torque by the transmission brake. According to a preferred embodiment, means is also provided for monitoring the position of a clutch actuator and sending a signal indicative thereof to the control unit, the control unit applying the transmission brake so that the braking torque applied thereby matches the reduction in clutch torque, as the clutch is released.

According to an alternative embodiment, the control unit controls the transmission brake in order to maintain the vehicle speed constant during the gear downshift.

According to another aspect of the present invention, means are provided for detecting the direction of movement of a vehicle from rest. The means for detecting the direction of movement comprise a plurality of vehicle speed sensors, wherein each sensor produces a pulsed signal, the frequency of the pulses corresponding to the speed of the vehicle, characterized in that the pattern of pulses produced by the sensors upon movement of the vehicle are compared to the pattern of pulses when the vehicle last came to rest, to determine the direction of movement of the vehicle.

BRIEF DESCRIPTION OF THE DRAWINGS

The invention is now described, by way of example only, with reference to the following drawings, in which.

DETAILED DESCRIPTION OF THE PREFERRED EMBODIMENT

Figure 1:
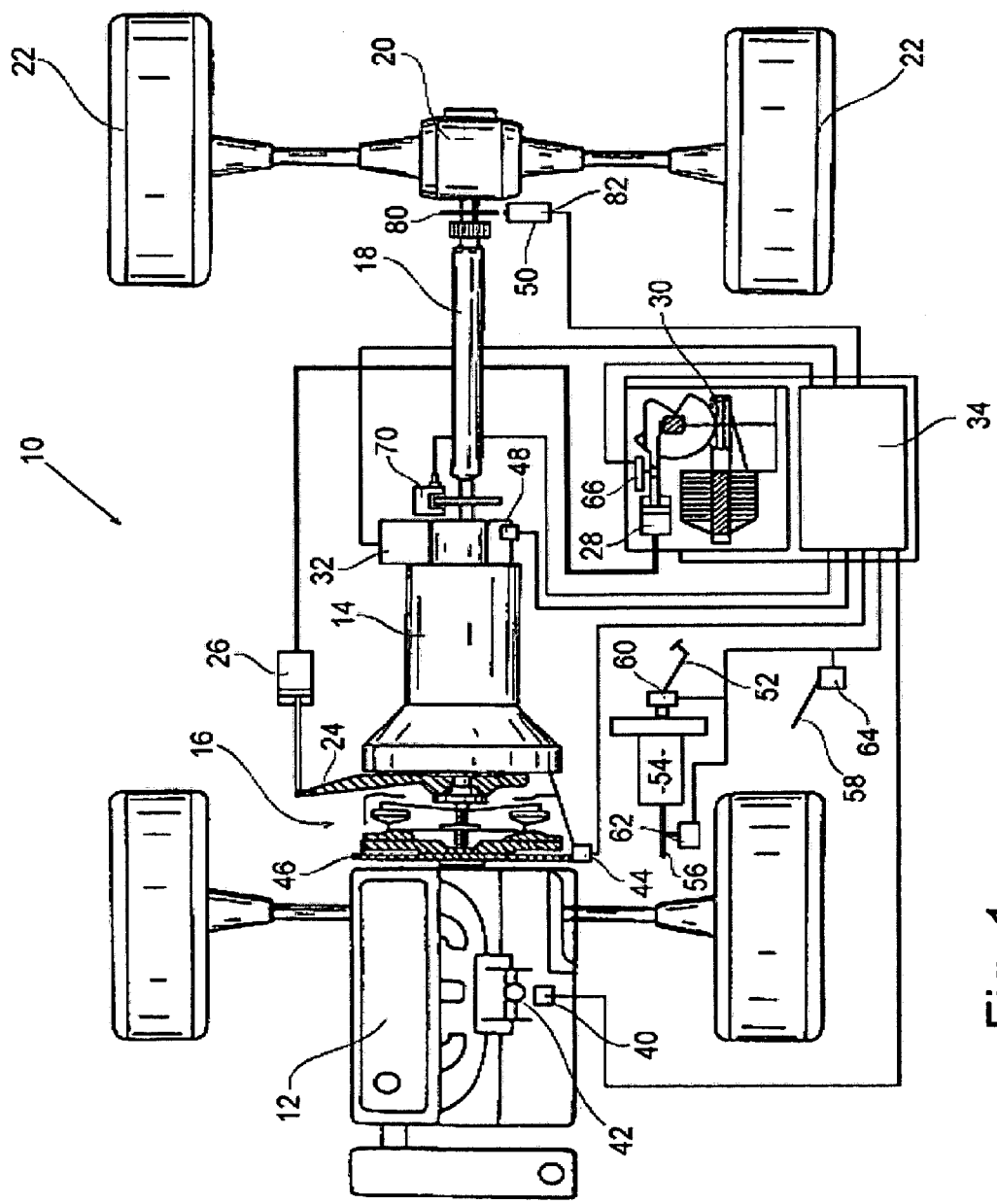
FIG. 1 illustrates diagrammatically a vehicle with an electric motor driven clutch actuator.

As illustrated in FIG. 1, a vehicle 10 has an internal combustion engine 12, which is connected to a gearbox 14 via a clutch 16. The gearbox 14 is connected by a drive shaft 18 and rear axle 20 to drive the rear wheels 22 of the vehicle 10.

The clutch 16 is operated by a release fork 24, which is operated by a hydraulic slave cylinder 26, under the control of a master cylinder 28, driven by an electric motor 30. Alternatively the clutch slave cylinder may be selectively connected to a source of hydraulic fluid under pressure or the drain via control valve means. According to alternative embodiments, the clutch release lever may be operated by pneumatic means or electromechanical means, the electromechanical means being connected to the release lever, either directly or by cable means.

The gearbox 14 is provided with gear engagement means 32, for example as disclosed in WO 02/066870, the disclosure content of which is incorporated into the disclosure content of the present application by reference thereto, by which engagement of a selected gear may be controlled by hydraulic, pneumatic or electromechanical means.

The electric motor 30 and gear engagement means 32 are controlled by means of an electronic control unit 34. A sensor 40 monitors throttle means 42 of the engine 12 and sends a signal indicative of the degree of throttle opening, to the control unit 34. A sensor 44 monitors the speed of rotation of a flywheel 46 of the engine 12 and sends a signal indicative of the engine speed, to the control unit 34. The gear box 14 is provided with a gear sensor 48 which sends a signal indicative of the engaged gear, to the control unit 34. A sensor 50 monitors the speed of rotation of the drive shaft 18 and sends a signal indicative of the vehicle speed, to control unit 34. A sensor 66 monitors the position of clutch master cylinder 28 and sends a signal indicative of the clutch position to the control unit 34.

A main or operating braking system of the vehicle, includes a brake pedal 52 which operates a master cylinder 54 which is connected to slave cylinders associated with each of the wheels 22 of the vehicle by means of hydraulic circuit 56. A parking or hand brake 58 is also provided, by which brakes associated with one or more of the wheels 22 may be applied when the vehicle is stationary. A sensor 60, for example a brake light switch, associated with the brake pedal 52; and/or a pressure sensor 62 which measures pressure in the braking circuit 56; and sensor 64 associated with the hand brake 58, send signals to the control unit 34, indicative of actuation of the operating brake or hand brake respectively.

With the transmission system disclosed above, the control unit 34 utilizes the signals from the various sensors to automatically control actuation of the clutch 16 and engagement and disengagement of the gears, during take-up from rest, changes from on gear to another and on coming to rest, as for example described in patent specifications EP0038113; EP0043660; EP0059035; EP101220; WO92/13208; and WO 02/066870 to the disclosure of which explicit reference is made and whose content is expressly incorporated in the disclosure content of the present application.

Figure 2:
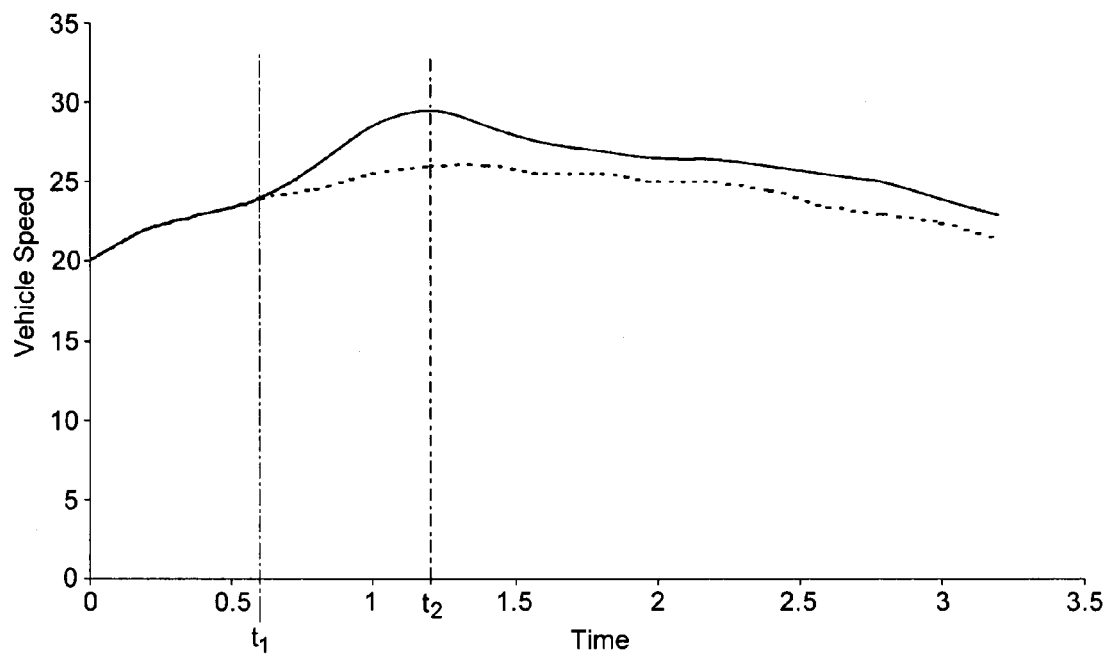
FIG. 2 shows a plot of vehicle speed against time, during a gear downshift, while the vehicle is under engine braking.
Figure 3:
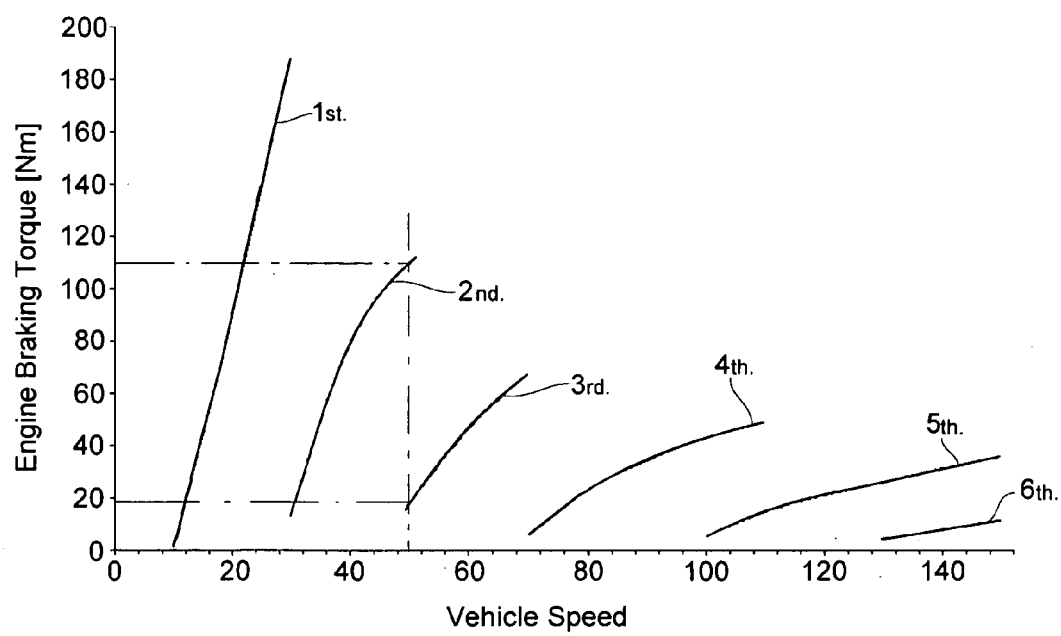
FIG. 3 shows a typical plot of effective engine braking torque for each gear.

When a vehicle is traveling down hill, the speed of the vehicle may be controlled using engine braking. As illustrated in FIG. 3, the effective engine braking torque for a given vehicle speed will depend on the gear engaged. Furthermore, there may be a significant braking torque difference between one gear and another, at a given vehicle speed, for example as illustrated in FIG. 3 a downshift from third to second gear at 50 kph will increase to engine braking torque from 20 Nm to 110 Nm. Consequently there may be an abrupt change in deceleration upon a gear downshift. Additionally when the clutch is released to change gear the vehicle may initially speed up, due to loss of engine braking while the clutch is disengaged. FIG. 2 shows (in full line) a typical plot of vehicle speed against time, during a gear downshift, when a vehicle is traveling down hill, the vehicle accelerating when the clutch 16 is released at time $t_1$ and decelerating abruptly when the clutch 16 is re-engaged at time $t_2$. The effects experienced in such circumstances are not a problem with manual transmissions, when the downshift is initiated by the driver, who will consequently be alert to the possible effects. However, if downshift is to be initiated automatically such effects would be unexpected and be disconcerting to the driver.

In accordance with the present invention, a transmission brake 70 is provided on the drive shaft 18. This transmission brake 70 is operated, hydraulically, pneumatically or by electromechanical means, under the control of the control unit 34, as described in greater detail below, in order to blend the clutch torque and transmission brake torque during the gear downshift, in order to mitigate the effects.

Figure 4:
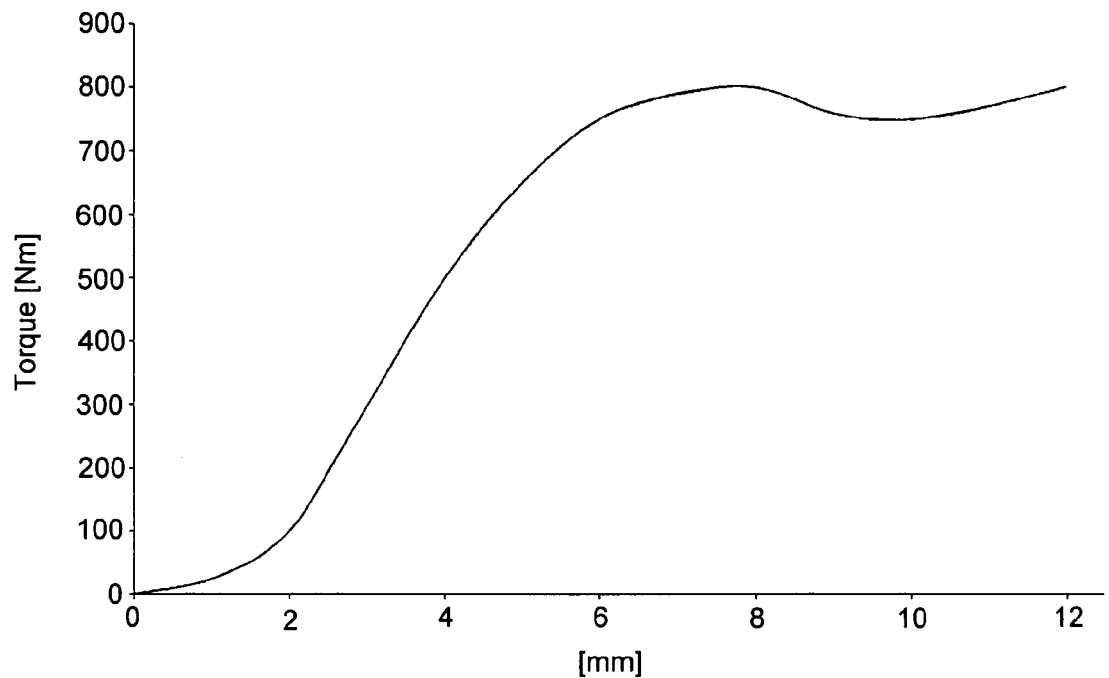
FIG. 4 is a typical plot of clutch torque against clutch actuator movement.
Figure 5:
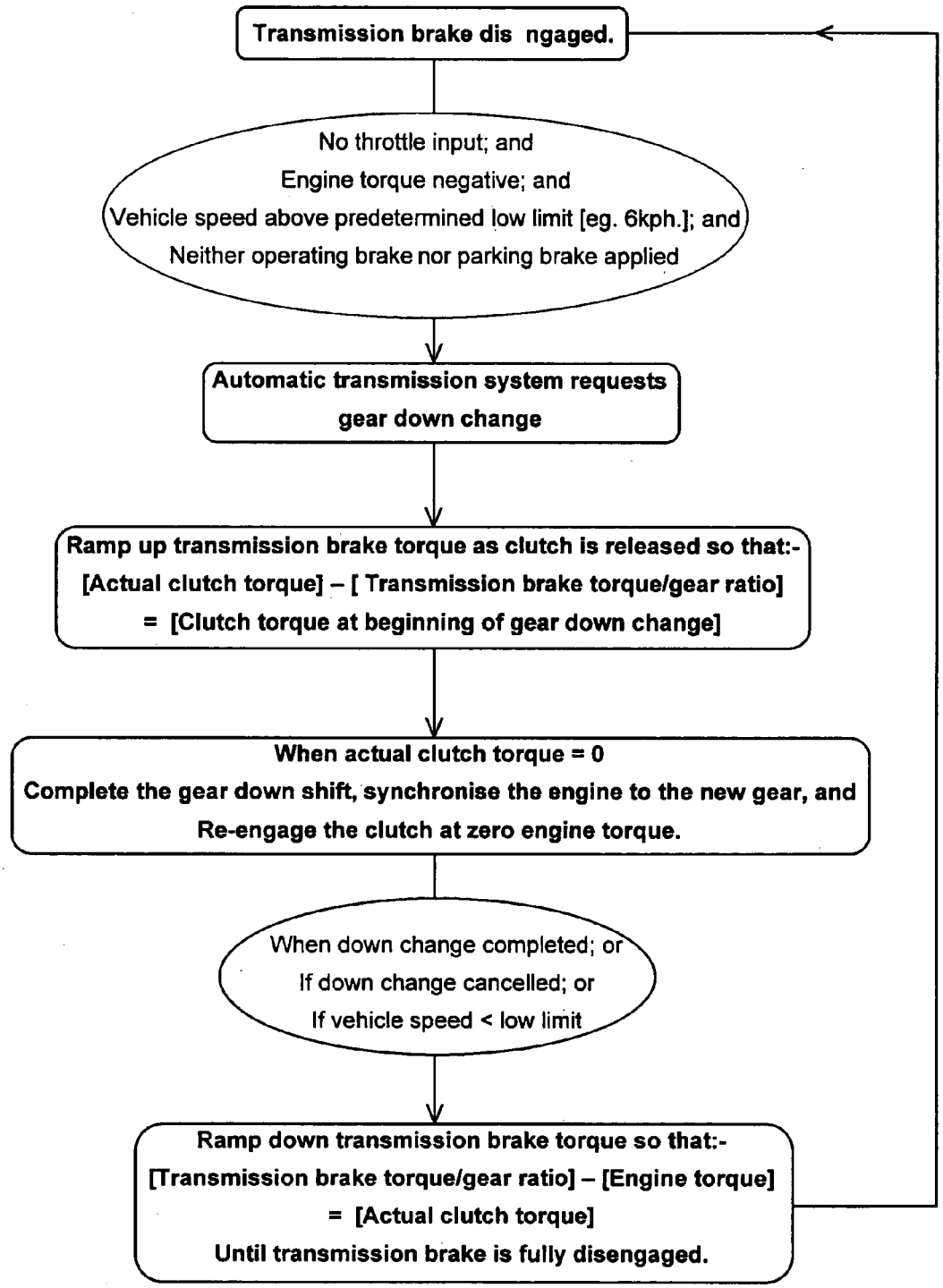
FIG. 5 is a flow diagram illustrating a gear downshift with one embodiment of the transmission system illustrated in FIG. 1.

As illustrated by FIG. 5, if the signals from sensors 40, 44, 50, 60, 62 and 64 indicate that there is no throttle input, the engine torque is negative, the vehicle speed is above a predetermined low limit, typically 6 kph, and neither the operating brake or parking brake are applied, then depending on the vehicle speed, the control unit may initiate a gear downshift. As the clutch 16 is released, the control unit 34 controls application of the transmission brake 70, so that the braking torque applied by the transmission brake 70 matches the reduction in clutch torque. This may be achieved using a map of clutch torque against position, as measured by sensor 66, as illustrated in FIG. 4, and a corresponding map of transmission brake torque against brake position or pressure in the transmission brake circuit.

Once the clutch 16 is fully disengaged, the currently engaged gear is disengaged, the engine is synchronized to the new gear, the new gear is engaged and the clutch 16 is re-engaged at zero engine torque. Upon completion or cancellation of the downshift; or if the vehicle speed falls below the predetermined low limit; or the operating brakes or hand brake are applied; the control unit 34 reduces the torque applied by the transmission brake 70, to provide a smooth transfer of torque between the brake 70 and clutch 16, so that the braking torque applied by the transmission brake is replaced by engine braking torque, without any abrupt deceleration.

According to an alternative embodiment of the invention, the control unit 34 may reduce the braking torque applied by the transmission brake 70, as the clutch torque increases. This may be achieved using the torque maps of the clutch 16 and transmission brake 70, as referred to above.

Figure 6:
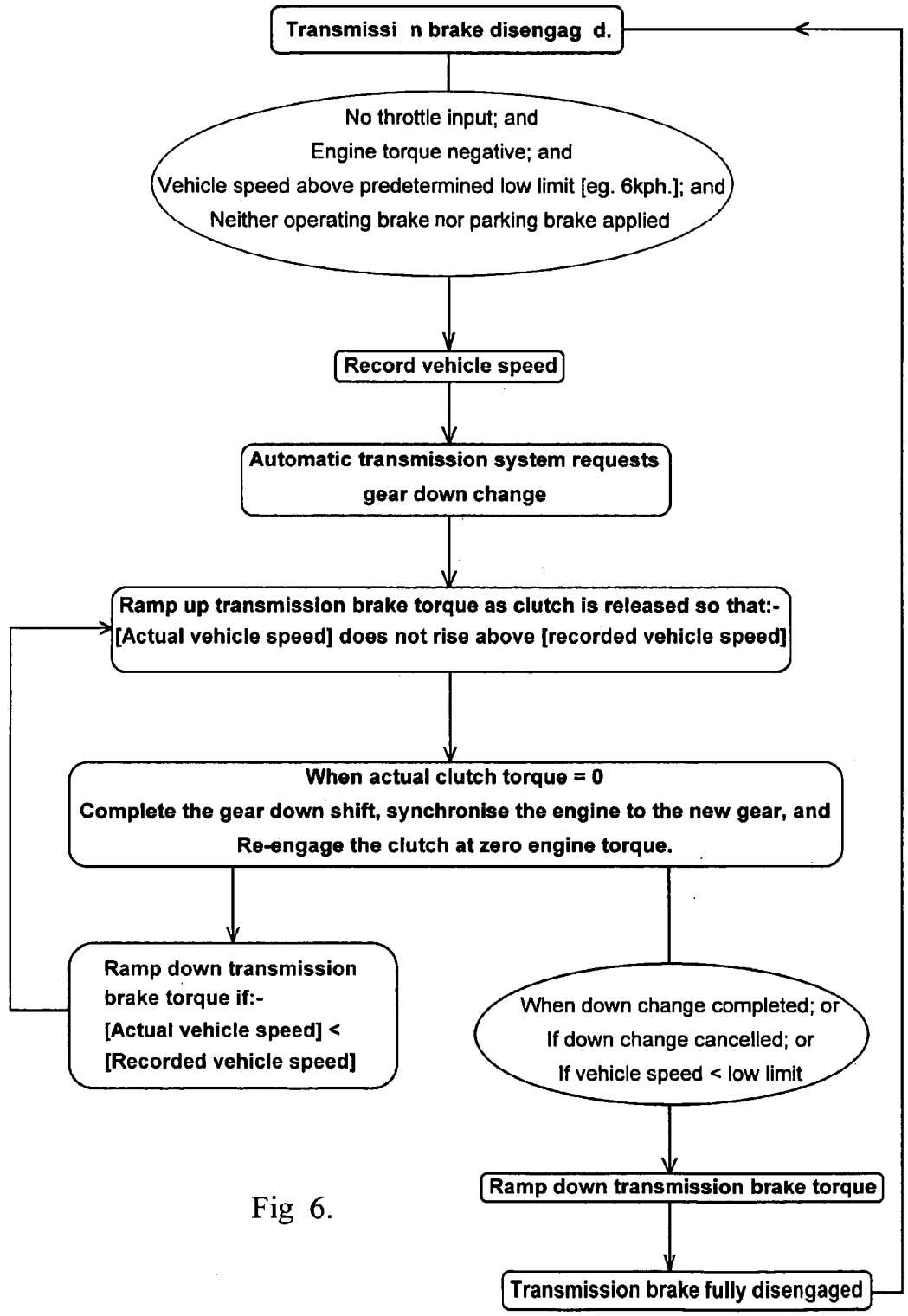
FIG. 6 is a flow diagram illustrating a gear downshift with an alternative embodiment of the transmission system illustrated in FIG. 1.

According to a further embodiment of the invention, as illustrated in FIG. 6, if the control unit 34 decides to initiate a gear downshift, using the criteria disclosed above, the road speed immediately before initiation of the gear downshift is recorded and the control unit 34 operates the transmission brake 70 to apply sufficient braking torque to prevent the vehicle speed rising above the recorded speed, this may be done using a closed feedback loop.

Upon completion or cancellation of the gear downshift; or if the vehicle speed is less than the predetermined value; or if the vehicle speed is less than the recorded value; or if the operating brakes or hand brake are applied, then the control unit 34 reduces the torque applied by the transmission brake 70. Again the braking torque applied by the transmission brake 70 will be reduced in controlled manner so that there is a smooth transition between braking by the transmission brake 70 and engine braking. If during the reduction of braking torque applied by the transmission brake 70, the vehicle speed increases above the recorded vehicle speed and, the gear downshift has not been cancelled; or the vehicle speed has not fallen below the predetermined value; or the operating brakes or hand brake have not been applied, then the control unit 34 may increase the braking torque applied by the transmission brake 70, to reduce the speed of the vehicle to below the recorded value.

Using the above methods, the transmission brake 70 may be used to prevent acceleration of the vehicle upon disengagement of the clutch 16 and to provide a smooth deceleration of the vehicle, upon completion of the gear downshift, as illustrated in broken line, in FIG. 2 of the drawings.

The transmission brake 70 of the present invention may furthermore be used to assist in start-up of the vehicle on an incline, as illustrated in FIG. 6 of the drawings. When starting a vehicle on an incline with an automated transmission system of the type disclosed above, upon release of the clutch 16 to select a take-up gear, if the operating brakes or parking brake of the vehicle are not applied, the vehicle may start to roll down hill in the direction opposite to that desired. In order to address this problem, it has been proposed to initiate a creep mode which involves selection of a take-up gear and partial engagement of the clutch to apply a predetermined clutch torque, prior to release of the parking brake or operating brakes of the vehicle. On, for example, steep inclines or where there is delay in actuation of the throttle to drive away, this can cause excessive clutch slippage leading to high thermal loads and clutch wear. Similar problems will arise if the driver attempts to hold the vehicle on an incline, by manipulation of the throttle.

Figure 7:
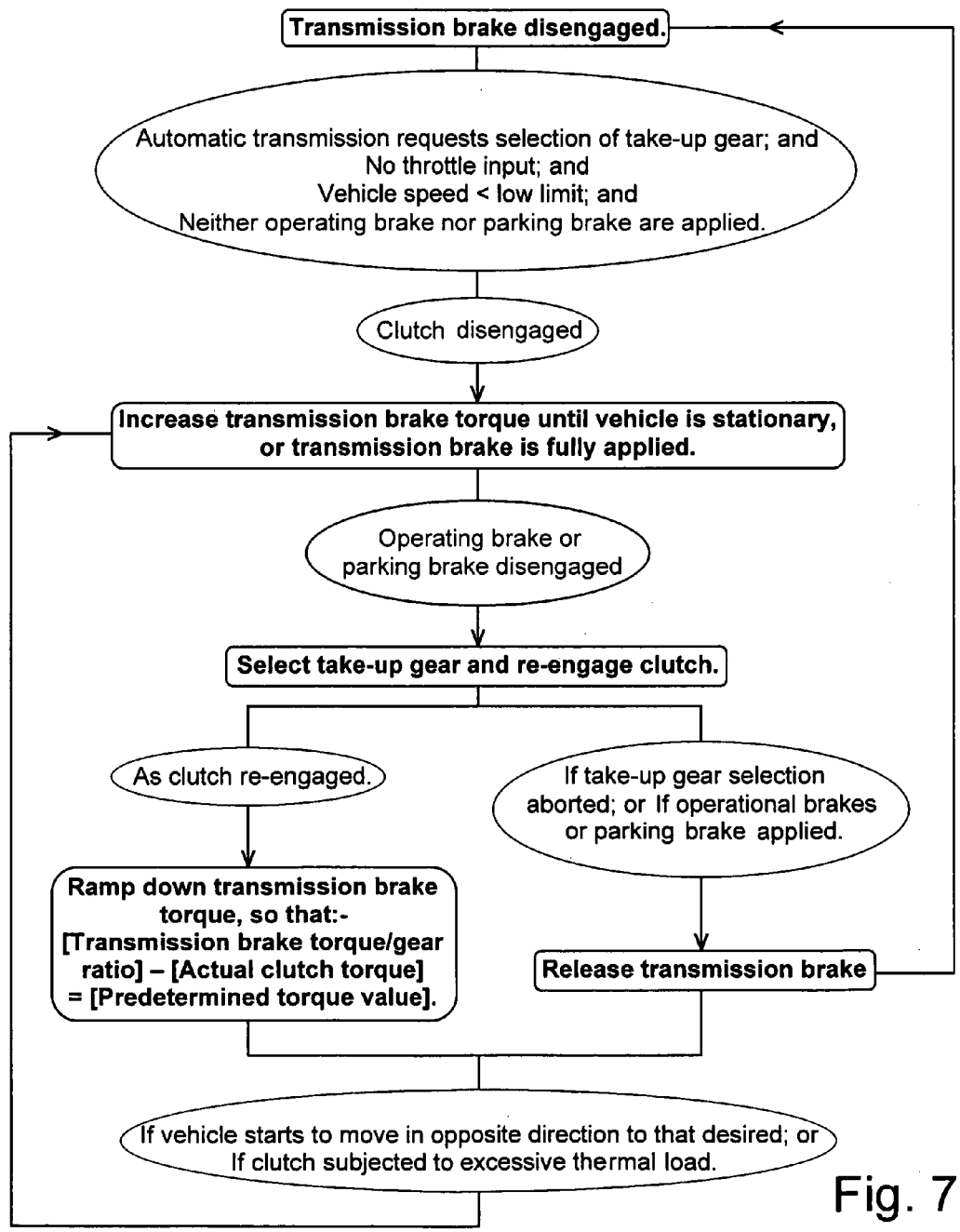
FIG. 7 is a flow diagram illustrating starting of the vehicle from rest on an incline with the transmission system illustrated in FIG. 1; and, FIG. 8 is a plot showing the pulses received from vehicle speed sensors associated with each of the wheels of a vehicle.

With the transmission according to the present invention, the control unit 34 may control the transmission brake 70 at start-up to apply a braking torque, which will hold the vehicle, thereby replacing all, or a proportion of the clutch torque. For example, as illustrated in FIG. 7, if control unit 34 requests selection of a take-up gear and the signals from sensors 40, 44, 50, 60, 62 and 64 indicate that there is no throttle input; the vehicle speed is below a predetermined low limit indicating that the vehicle is at rest; and either the operating brake or parking brake are applied, then the control unit 34 may apply the transmission brake 70, so that the transmission brake 70 will hold the vehicle on an incline. The application of the transmission brake 70 may be controlled by control unit 34, so that the braking torque applied by the transmission brake 70 increases, as the clutch 16 is released, in order to permit selection of a take-up gear. Alternatively the transmission brake 70 may be applied, under control of the control unit 34, as the parking brake or operating brakes of the vehicle are released after selection of a start-up gear.

Once the take-up gear has been selected control unit 34 re-engages the clutch 16. At the same time, control unit 34 reduces the braking torque applied by transmission brake 70, so that the effective torque applied by the clutch 16 and transmission brake 70 are sufficient to hold the vehicle on the incline. This may be achieved by reducing the torque applied by the transmission brake 70 as the torque applied by the clutch 16 increases so that the overall torque equates to the predetermined torque value applied by the clutch only, in systems proposed hitherto, to induce a creep mode. Alternatively the control unit 34 may control release of the transmission brake 70, using closed loop feedback systems, which monitor, for example, movement of the vehicle in the reverse direction to that desired and/or thermal loading of the clutch 16.

The control unit 34 will also control the transmission brake 70, to reduce the braking torque thereof, if the throttle is actuated to drive the vehicle away, or if the parking brake or operational brakes of the vehicle are not released or are re-applied.

Figure 8:
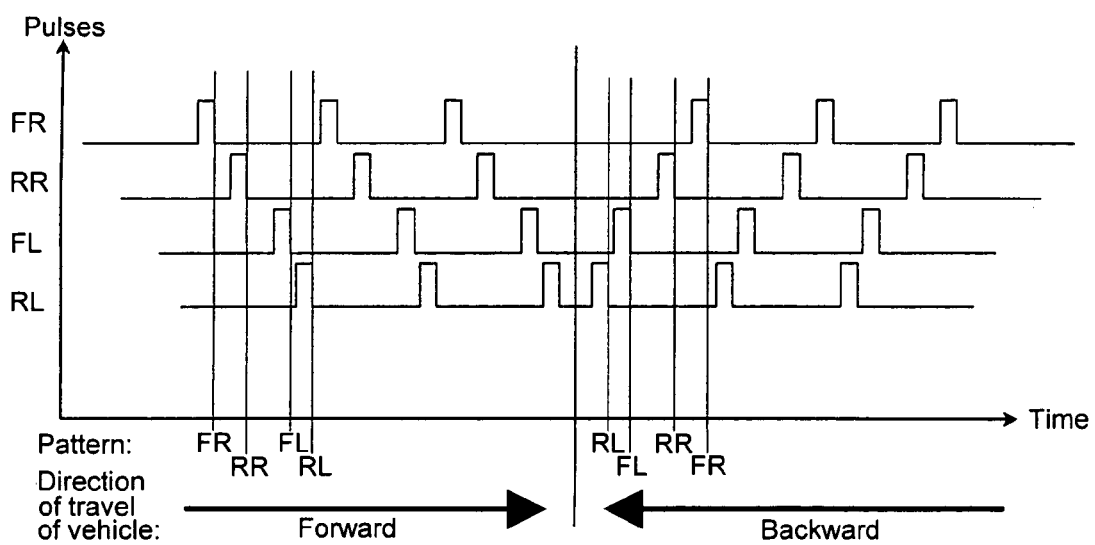

The sensor 50 comprises a toothed wheel 80 which is mounted for rotation with the drive shaft 18. An inductive pickup 82 is positioned in juxtaposed relationship to the teeth of wheel 80. As the toothed wheel 80 rotates, the pickup 82 produces a pulsed signal, the frequency of signal being proportional to the speed of rotation of the wheel 80. According to an alternative embodiment of the invention, the pickup 82 may be replaced by a plurality of similar pickups, each pickup being associated with a different wheel of the vehicle. Such pickups may form part of an anti-lock braking system. The toothed wheels 80 of the pickups being similar, the pulsed signals produced by each of the pickups will be of the same frequency, but the pulses will be out of phase, as illustrated in FIG. 8. As the wheels 22 of the vehicle are generally rotating at the same speed, particularly when the vehicle speed is low, the pattern of pulses of the four signals will remain substantially constant, at least in the short term. The pattern will however reverse depending to the direction of travel of the vehicle, as illustrated in FIG. 8. The use of multiple sensors 50 may consequently be used, for example, to determine whether the vehicle is moving in the opposite direction to that desired, when the vehicle is starting on an incline.

In order to achieve this, the pattern of pulses produced by two or more sensors 50 is recorded as the vehicle comes to rest and is compared with the pattern of pulses when the vehicle next starts-up from rest.

It should be noted that the plurality of sensors 50 need not be associated with different wheels of the vehicle, but may be associated with the same component, for example the drive shaft 18, provided that the teeth on the wheels 80 of the sensors are angularly misaligned, so that the pulses of the signals produced by the sensors will be out of phase. Alternatively a sensor having a single toothed wheel 80 with two pickups 82, one offset from the other, so as to produce two pulsed signals, the pulses of which are out of phase, may be used. Where only two signals are used, the pulses of one signal must be offset from those of the other signal by less than half the frequency of the pulses. In this manner it is ensured that there will be a reversal in the pattern, upon reversal of the direction of motion of the vehicle. For example if only sensors FR and RR are used in FIG. 8, then for rotation in one direction, there is a short gap between successive pulses from sensors FR and RR and a long gap between successive pulses from sensors RR and FR, while for rotation in the opposite direction there is a long gap between successive pulses from sensors FR and RR and a short gap between successive pulses from sensors RR and FR. With four sensors, on reversal, there is a change in sequence of the pulses from the four sensors, for example from FR:RR:FL:RL to RL:FL:RR:FR.

The patent claims submitted with the application are proposed formulations without prejudice to the achievement of further patent protection. The applicant reserves the right to submit claims for further combinations of characteristics, previously only disclosed in the description and/or drawings.

References back used in sub-claims refer to the further development of the subject of the main claim by the characteristics of the respective sub-claim; they are not to be understood as a waiver with regard to achieving independent item protection for the combination of characteristics in the related sub-claims.

Since the subject of the sub-claims can form separate and independent inventions with reference to the prior art on the priority date, the applicant reserves the right to make them the subject of independent claims or of division declarations. Furthermore, they may also contain independent inventions, which demonstrate a design, which is independent of one of the objects of the preceding sub-claims.

The embodiments are not to be considered a restriction of the invention. Rather, a wide range of amendments and modifications is possible within the scope of the current disclosure, especially those variations, elements and combinations and/or materials which, for example, the expert can learn by combining individual ones together with those in the general description and embodiments in addition to characteristics and/or elements or process stages described in the claims and contained in the drawings with the aim of solving a task thus leading to a new object or new process stages or sequences of process stages via combinable characteristics, even where they concern manufacturing, testing and work processes.

What is claimed is:

1. An apparatus for detecting the direction of movement of a vehicle on starting from rest, comprising: a plurality of vehicle speed sensors, said vehicle speed sensors each producing a pulsed signal, the frequency of the pulses corresponding to the speed of the vehicle, characterized in that the pulses of one sensor are out of phase with those of another sensor by less than half the frequency of the pulses, the pattern of pulses produced by the sensors at start-up of the vehicle being compared to the pattern of pulses when the vehicle last came to rest.

2. The apparatus recited in claim 1 wherein the vehicle speed sensors are associated with each of the wheels of the vehicle.

3. The apparatus recited in claim 2 wherein two vehicle speed sensors are associated with a common component of a vehicle transmission system, the sensors being arranged to produce pulsed signals which are out of phase.

* * * * *